(12) United States Patent
Molyneux

(10) Patent No.: US 12,540,055 B2
(45) Date of Patent: Feb. 3, 2026

(54) RAIL CLIPS

(71) Applicant: Godfrey Molyneux, Pittsburgh, PA (US)

(72) Inventor: Godfrey Molyneux, Pittsburgh, PA (US)

( * ) Notice: Subject to any disclaimer, the term of this patent is extended or adjusted under 35 U.S.C. 154(b) by 925 days.

(21) Appl. No.: 17/300,029

(22) PCT Filed: Aug. 25, 2019

(86) PCT No.: PCT/US2019/048056
§ 371 (c)(1),
(2) Date: Feb. 22, 2021

(87) PCT Pub. No.: WO2020/046771
PCT Pub. Date: Mar. 5, 2020

(65) Prior Publication Data
US 2021/0395049 A1    Dec. 23, 2021

Related U.S. Application Data

(60) Provisional application No. 62/722,922, filed on Aug. 26, 2018.

(51) Int. Cl.
*B66C 7/08* (2006.01)
*E01B 9/32* (2006.01)
(Continued)

(52) U.S. Cl.
CPC .............. *B66C 7/08* (2013.01); *E01B 9/32* (2013.01); *E01B 9/42* (2013.01); *E01B 9/66* (2013.01)

(58) Field of Classification Search
CPC ..... E01B 9/66; E01B 9/32; E01B 9/42; E01B 2201/04; E01B 9/44; E01B 9/02; E01B 9/40; B66C 7/08
See application file for complete search history.

(56) References Cited

U.S. PATENT DOCUMENTS 3,004,715 A * 10/1961 Gadd .................... F16B 13/141
238/349
3,923,245 A * 12/1975 Marchant ................. B66C 7/08
238/346

(Continued)

FOREIGN PATENT DOCUMENTS

WO    WO-2014124935 A1 *  8/2014 ............... B66C 7/08

*Primary Examiner* — Cheng Lin

(57) ABSTRACT

Rail Clip Assembly A rail clip assembly is disclosed herein. The rail clip assembly, in accordance with an embodiment of the present subject matter, comprises a base body attachable to a support surface, wherein the base body defines a cavity at an underside thereof. The base body comprises a first wall that is adjacent the rail when the base body is secured on the support surface. A depression or a recess is configured on the first wall, and a substantially horizontal slot is configured on the base body extending toward the first wall. The assembly further comprises a top body assemblable on the base body. The top body comprises a rail abutting portion that defines a substantially L-shaped surface to abut the rail, and a slot configured on the top body. The assembly further comprises a screw for assembling together the base body and the top body, wherein the screw may be any standard screw with a polygonal head such that a corner of the screw head is fitted inside the depression or the recess in an assembled configuration thereof.

10 Claims, 6 Drawing Sheets

(51) Int. Cl.
*E01B 9/42* (2006.01)
*E01B 9/66* (2006.01)

(56) References Cited

U.S. PATENT DOCUMENTS

| | | | |
|---|---|---|---|
| 8,205,803 B2* | 6/2012 | Couvreur | B66C 7/08 |
| | | | 238/351 |
| 10,947,092 B2* | 3/2021 | Bygrave | E01B 9/46 |

* cited by examiner

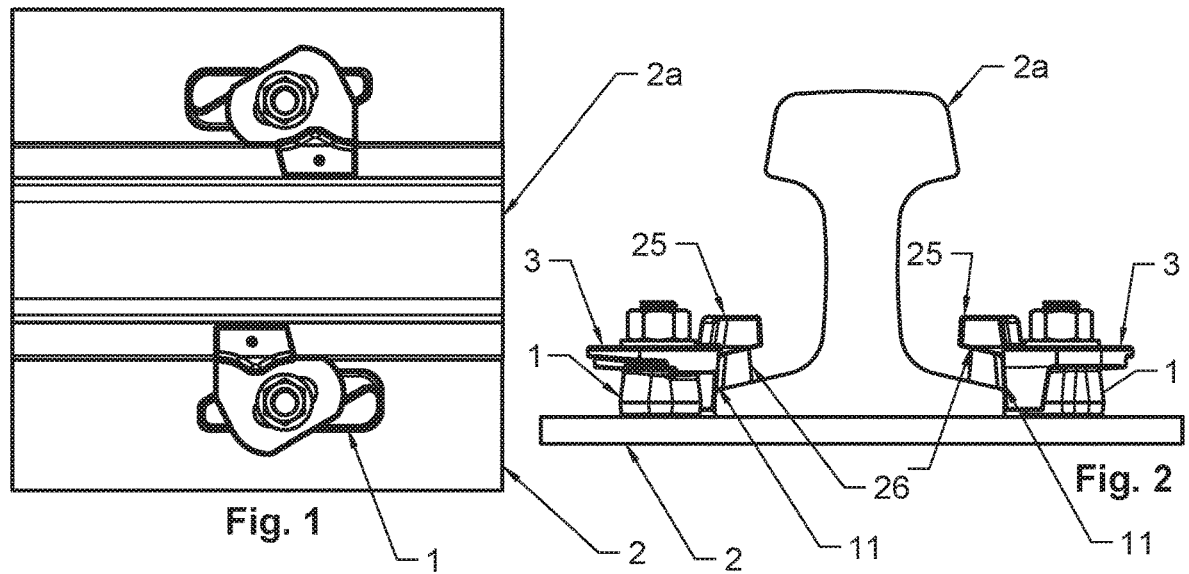
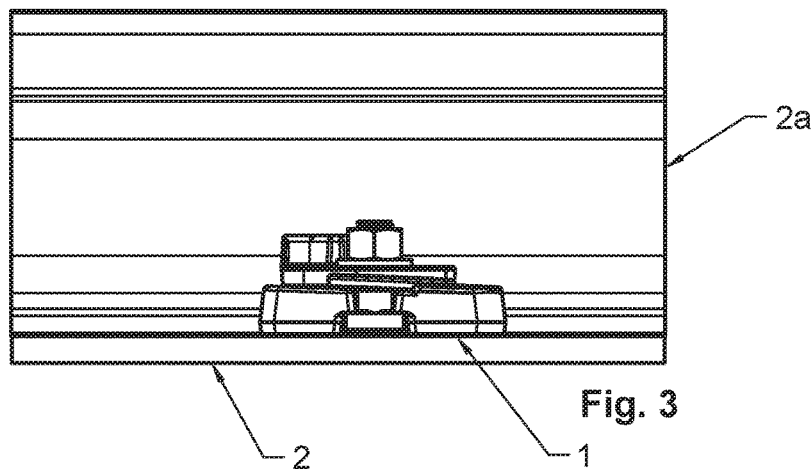

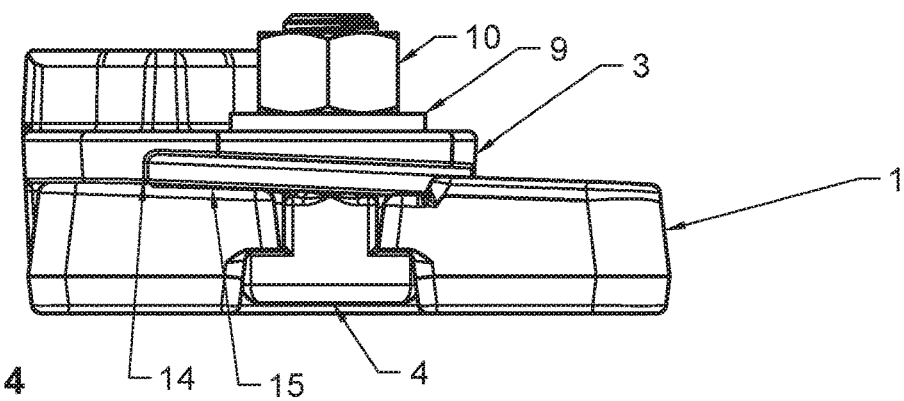
Fig. 4
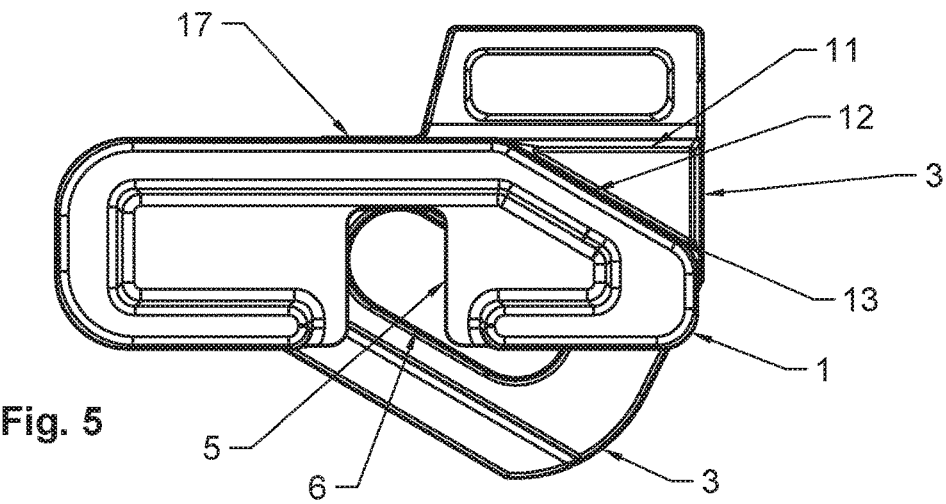
Fig. 5
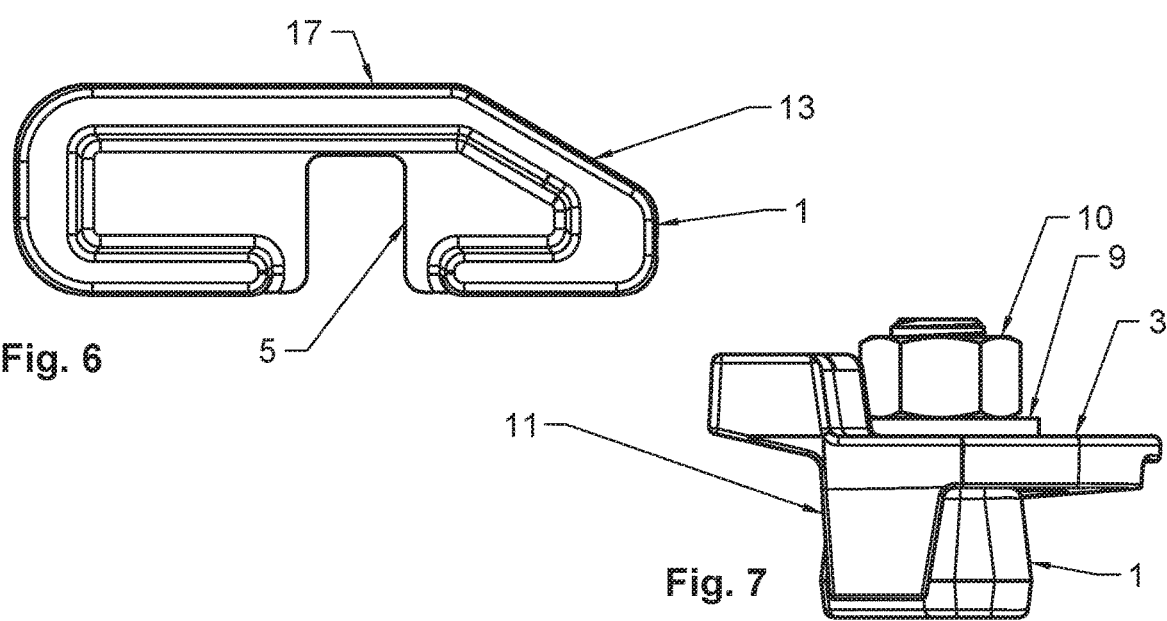
Fig. 6
Fig. 7

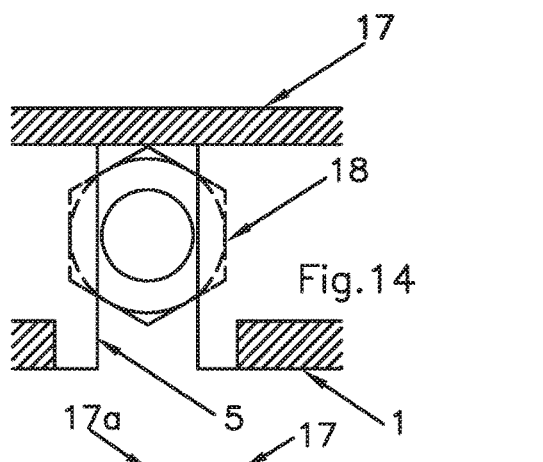
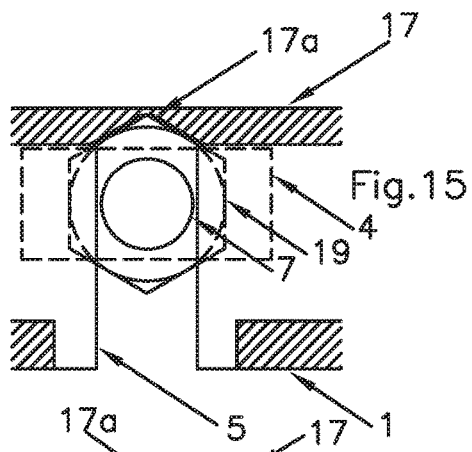
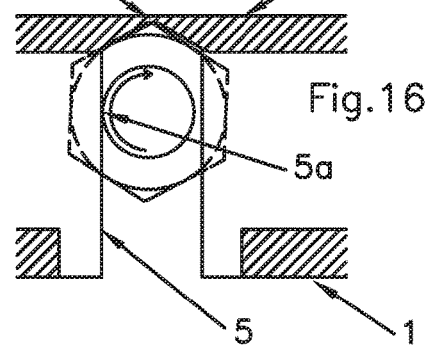
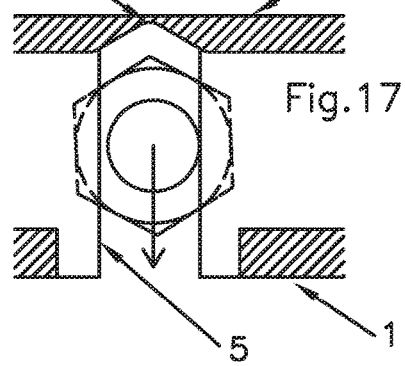
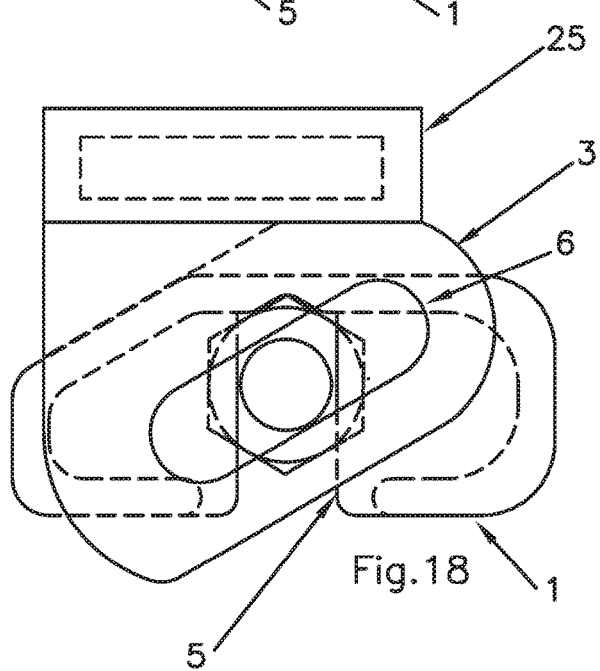
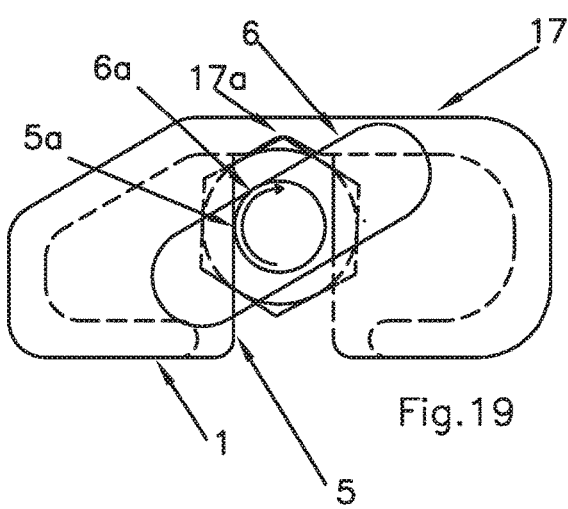

RAIL CLIPS

TECHNICAL FIELD

The present subject matter relates to the field of clip assemblies. In particular, the present subject matter relates to a clip assembly for rails, wherein the rails are of the type that allow a crane to travel thereon.

BACKGROUND

Rail clip assemblies for rails carrying cranes are known in the art. Typically these rail clips provide a means to adjust the later allocation of the rail. These rail clips resist the lateral wheel loads from the crane that are transferred to the rail, and then transferred to the rail clips. The rail clips transfer these loads into the supporting structure. Unlike railroad rails, these rails that provide the track or runway for the crane are not tied together with rail road ties or sleepers. It is important that the rails have the correct alignment and are parallel in relation to each other to allow for the smooth travel of the crane. Often the rail supporting surface is narrow so that there is a limited space to install rail clips against the rail.

SUMMARY

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

An embodiment of the present subject matter envisages a clip assembly for securing a rail to a support surface. The assembly comprises base body attachable to the support surface, wherein the base body defines a cavity, wherein the cavity and the support surface define a space at the underside of the base body. The base body comprises a first wall that is adjacent the rail when the base body is secured on the support surface, the first wall also defines an inclined portion; a depression is configured on the first wall; and a substantially horizontal slot is configured on the base body extending towards the first wall.

The rail clip assembly further comprises a top body assemblable on the base body. The top body comprises a rail abutting portion that defines a substantially L-shaped surface to abut the rail; a slot is configured on the top body; and a screw is fittable into the first wall and passes through the slot configured on the top body, wherein a portion of the screw fits into the depression of the first wall to secure the screw while the screw is received within the space, and wherein a shank of the screw abuts a portion of the substantially horizontal slot on the base body and the slot on the top body when a nut is tightened on the shank for securing the top body to the base body to secure the rail.

In one embodiment of the present subject matter, the rail abutting portion fits operatively between the rail and the inclined portion in an assembled configuration of the top body and the base body.

In one embodiment of the present subject matter, the top body and the base body have complementary inclined abutting surfaces that facilitate guided sliding movement between the top body and the base body.

In one embodiment of the present subject matter, wherein the complementary inclined abutting surfaces, the slot on the top body, and the inclined portion of the base body are inclined at identical angle.

In one embodiment of the present subject matter, the screw is a standard screw having a polygonal head to fit into the depression.

Another embodiment of the present subject matter depicts a rail clip assembly having a different configuration. The assembly comprises base body attachable to the support surface, wherein the base body defines a cavity, wherein the cavity and the support surface define a space at the underside of the base body. The base body comprises a first wall that is adjacent the rail when the base body is secured on the support surface, the first wall also defines an inclined portion; a recess is configured on the first wall; and a substantially horizontal slot is configured on the base body extending towards the first wall.

The rail clip assembly further comprises a top body assemblable on the base body. The top body comprises a rail abutting portion that defines a substantially L-shaped surface to abut the rail; a slot is configured on the top body; and a screw is fittable into the first wall and passes through the slot configured on the top body, wherein a portion of the screw fits into the recess of the first wall to secure the screw while the screw is received within the space, and wherein a shank of the screw abuts a portion of the substantially horizontal slot on the base body and the slot on the top body when a nut is tightened on the shank for securing the top body to the base body to secure the rail.

In one embodiment of the present subject matter, the rail abutting portion fits operatively between the rail and the inclined portion in an assembled configuration of the top body and the base body.

In one embodiment of the present subject matter, the top body and the base body have complementary inclined abutting surfaces that facilitate guided sliding movement between the top body and the base body.

In one embodiment of the present subject matter, wherein the complementary inclined abutting surfaces, the slot on the top body, and the inclined portion of the base body are inclined at identical angle.

In one embodiment of the present subject matter, the screw is a standard screw having a polygonal head to fit into the recess.

In one embodiment of the present subject matter, the rail clip assembly further comprises at least one stiffener formation configured on the underside of the base to interact with the screw adjacent a head portion of the screw when the screw is received within the substantially horizontal slot on the base body. The configuration of at least one stiffener formation facilitates a formation of a gap at the underside of the stiffener formation, wherein the gap prevents the entrapment of air and liquids between the base body and the support surface.

These and other features and advantages of the present subject matter will become more readily apparent from the attached drawings and the detailed description of the preferred embodiments, which follow.

BRIEF DESCRIPTION OF DRAWING

The present subject matter is hereinafter described with reference to non-limiting accompanying drawing in which:

FIG. 1 thru FIG. 3 illustrate views of a conventional rail clip assembly coupled to a rail.

FIG. 4 thru FIG. 14 illustrate various views of the conventional rail clip assembly.

FIG. 15 thru FIG. 17 illustrates schematic views of a screw configuration used in a rail clip assembly, in accordance with some embodiments of the present subject matter.

FIG. 18 and FIG. 19 illustrate top views of the rail clip assembly, in accordance with an embodiment of the present subject matter.

DETAILED DESCRIPTION

The present subject matter envisages a rail clip which has a welded base that is light in weight and has a narrow footprint, is economical to produce and uses standard bolts, standard nuts, and washers. Additionally, increased support is provided to prevent the pullout of the bolt from its retaining pocket within the clip base. This support structure within the clip base also provides for the evacuation of water during the life of the installation and also for the evacuation of air to allow for the base cavity to be hot dipped galvanized.

Figure 8:
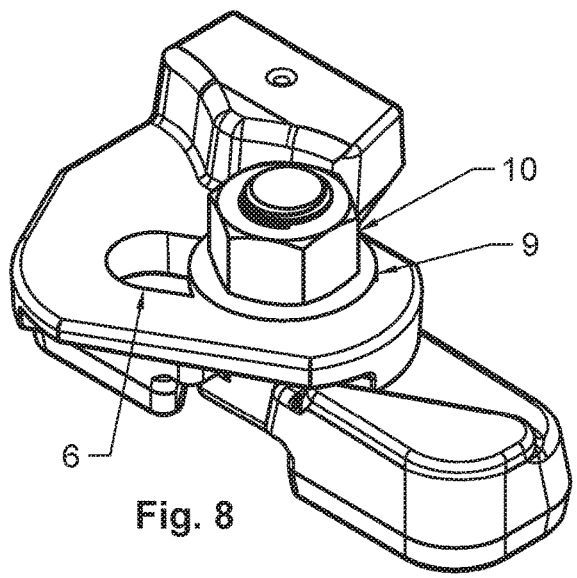
Figure 9:
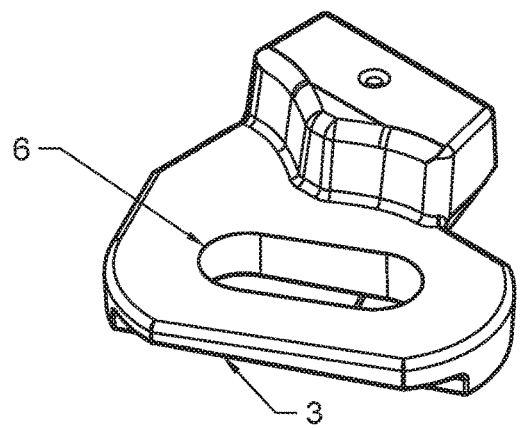
Figure 10:
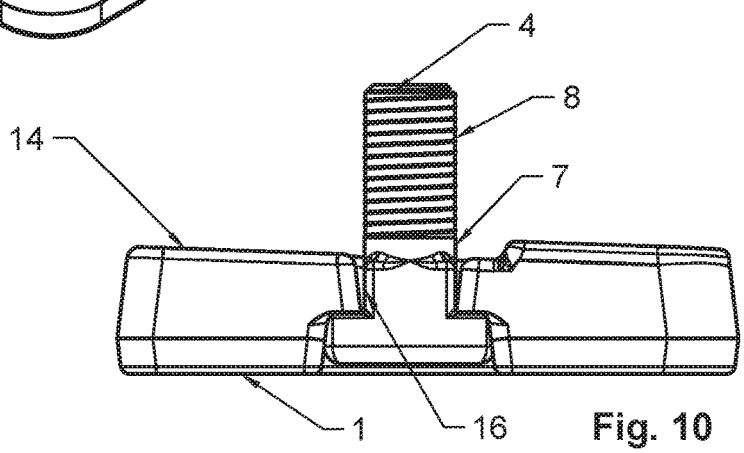
Figure 11:
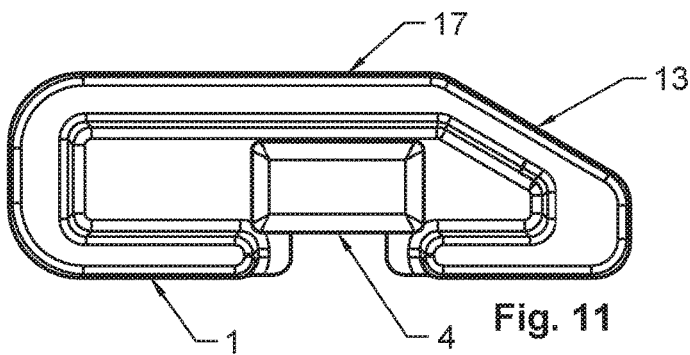
Figure 12:
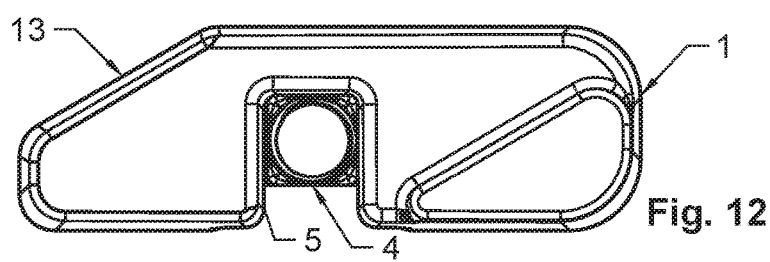
Figure 13:
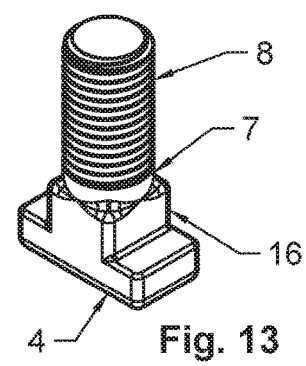

In the conventional rail clip assembly which is illustrated in FIGS. 1 to 13, a rail clip, which abuts a rail 2a, has a weldable metal base 1. The base 1 is welded to the support surface 2. The rail clip assembly further comprises a top 3 that slides relative to the base 1. A special "T" bolt 4 is installed and captured within the base 1. The base has a slot 5 to allow the installation of the bolt within the base. The top 3 has a slotted hole 6 through which the shank of the bolt 7 passes. The top has a surface 11 that abuts the rail 2a and a surface 12 that corresponds with a surface 13 of the base, which is set at an angle in relation to the length of the rail's edge which the rail clip top surface 11 abuts. The angle of the slotted hole 6 in the top 3 is parallel with the surface 13 of the base that is set at an angle, such that the top 3 can slide relative to the base 1. As seen in FIG. 8, the clip top 3 and the clip base 1 have complementary inclined abutting surfaces 1a, 3a that facilitate guided sliding movement between the clip top 3 and the clip base 1. With reference to FIG. 4, the clip base 1 has an upper surface 14 which is angled upwards. The clip top 3 has a lower surface 15 which is angled correspondingly to the upper surface 14 of the clip base. When the clip top 3 slides laterally away from the rail, a wedging action is developed which moves the clip top vertically relative to the underside of the washer 9 and the nut 10 that are assembled on the "T" bolt 4. With reference to FIGS. 10 and 13, the special "T" bolt 4 has a squared section of its shank 16 at the location where the shank passes through the slot 5 in the base 1. This square shank prevents the rotation of the bolt relative to the base 1 and relative to the slot 5. FIG. 11 is a bottom view of the base and FIG. 12, is a top view of the base. With reference to FIG. 11 the welded base is hollowed out so that the central area of the base has a large cavity open at the bottom, open through the slot 5 in the top of the base 1 and open through the gap in the rear of the base to provide for the installation of the bolt. The welding of the base to the support surface 2 closes the cavity from the bottom. With reference to FIG. 11, the "T" bolt 4 is designed so that the shank of the bolt can be close to the wall 17 of the base that is adjacent to the rail and consequently close to the edge of the rail. This allows for a narrow footprint for the rail clip relative to the rail and relative to the rail support surface. It is to be noted that the wall 17 defines the surface 13 that has an inclined configuration, as seen in FIG. 11. In accordance with one embodiment, the complementary inclined abutting surfaces 1a, 3a, the slot 6 on the clip top 3, and the inclined portion 13 of the clip base 1 are inclined at identical angle.

With reference to FIGS. 1, 2, 3, 4, 7, 8, 10 & 13, when the conventional rail clip assembly is assembled against the rail 2a, with the clip base 1 welded to the support surface 2, the special "T" bolt 4 installed within the base 1 and the clip top 3 is assembled upon the clip base 1. Referring to FIG. 5, the top 3 can slide forward and backward relative to the base 1 along of the surface that corresponds to the surface of the clip top 12 that engages with the surface 13 of the clip base 1. The slotted hole 6 which is parallel to surfaces 12 and 13 allows the clip top 3 to slide relative to the bolt shank 7. This sliding movement enables the surface of the top 11 that abuts the rail 2a to locate the rail laterally relative to the clip base 1 and relative to the supporting surface 2 to which the base 1 is welded. When the washer 9 and threaded nut 10 are assembled onto the threaded shank of the "T" bolt 4 and the nut 10 rotated to compress the washer onto the clip top and onto the clip base, the bolt is prevented from rotating within the base by the engagement of the square shank portion 16 of the "T" bolt 4 within the slot 5 of the clip base 1. With reference to FIGS. 4, 7 and 8, when all components are assembled and the nut is tightened as previously described, the clip top is fixed in place and prevented from sliding relative to the clip base 1, the support surface 2 and the rail 2a. This allows the rail clip to adjust the lateral location of the rail relative to the support surface 2. When force from the rail is applied to the clip top surface 11, the clip top remains fixed in position because of the interaction of the rail clip components as described earlier.

FIG. 6 is a bottom view of the clip base 1. As previously described the clip base has a large cavity as seen in FIG. 6 the peripheral walls of which are open at the rear to allow the entry of the "T" bolt 4 to travel into the slot 5 once the base has been welded to the support surface. The peripheral walls of the clip base are relatively thin and this lightens the weight of the base.

A disadvantageous aspect of the conventional rail clip assembly is that it requires the usage of a specifically designed bolt 4. More specifically, the shank of the bolt 4 has two different cross sections, i.e., a square or a rectangular cross section just below the head of the bolt 4 followed by a circular cross section having thread formations for facilitating the assembly of a nut thereon. This specifically designed bolt 4 is relatively difficult to manufacture and directly impacts the manufacturing costs associated with the rail clip assembly.

Another disadvantageous aspect of the of the conventional rail clip assembly is that the conventional rail clip assembly fails to provide sufficient means or feature for facilitating the complete evacuation of the water during the life of the installation and also for the complete evacuation of air to allow for the base cavity to be hot dipped galvanized. In accordance with one embodiment of the present invention, a gap is configured in the wall 17 for facilitating the aforementioned evacuation.

The present subject matter envisages a rail clip assembly that includes a means for facilitating the evacuation of the water during the life of the installation and also for the evacuation of air to allow for the base cavity to be hot dipped galvanized. Also, the rail clip assembly, in accordance with the present subject matter, envisages a configuration that does not require the use of the specifically designed bolt 4, as was the case with the conventional rail clip assembly. Any standard screw of the required size can be used in the rail clip assembly envisaged in the present subject matter.

Reference hereinafter is directed to FIG. 15 thru FIG. 30, which illustrate different embodiments of the present subject matter. It is to be noted that a rail clip assembly, in accordance with an embodiment of the present invention, includes similar components to the conventional rail clip assembly described with reference to FIG. 1 thru FIG. 14. As such, similar components are indicated using identical reference numbers for the sake of simplicity of the present disclosure. Furthermore, the explanation of the similar components is not repeated herein for the sake of brevity of the present disclosure.

An advantageous aspect of the of the rail clip assembly, in accordance with an embodiment of the present subject matter, is that its configuration and design with allows the use of any conventionally available standard screw instead of the specially designed bolt 4, as was the case with the conventional rail clip assembly. In accordance with one embodiment, the bolt can be a standard bolt either with a square head or a hex head as shown, for example, in FIG. 24. In the conventional rail clip assembly, the use of a standard hex or square headed bolt is not possible because the wall of the clip base that is closest to the rail interferes with the the location of the bolt head as shown in FIG. 14. FIG. 14 indicates the closest the hex headed bolt, in this orientation, can get to the clip base wall 17, and therefore to the rail. However, as shown in FIG. 15 by penetrating the wall of the base with the corner of the bolt head at location 17a, the bolt shank 7 can be moved to the same location in relation to the wall of the base and the rail edge as exists with the specially designed "T" bolt 4, as used in the conventional rail clip assembly. By making this penetration into the wall of the clip cavity, the bolt head corner is held at this location in the wall so that when the bolt is rotated because of a tightening action, the bolt head is forced to pivot about the corner of the bolt that is held by the wall. This forces the bolt shank to collide against the wall of the slot 5 in the base at location 5a (see FIG. 16). FIG. 17 shows prior to the placement of the clip top 3 onto the clip base 1, a square headed or in this case a hex headed bolt 18 is free to move along the slot 5 in the base, and thereby migrate from the clip base 1. However, as shown in FIG. 18, once the clip top 3 with the slot 6 is located onto the clip base 1 facilitates the capture of the bolt location so that the bolt can no longer slide along the slot 5 in the clip base 1. In FIG. 19, only the clip top slot 6 is shown. The outline of the clip top 3 has been removed for simplicity. FIG. 19 shows the corner of the bolt head is held in the wall of the cavity at location 17a. When the bolt is rotated by the action of tightening the nut, the bolt head corner cannot escape from the grip of the cavity wall because the bolt shank is held in its location by the slot 5 in the clip base 1 at location 5a and/or by slot 6 in the clip top at location 6a.

Figure 20:
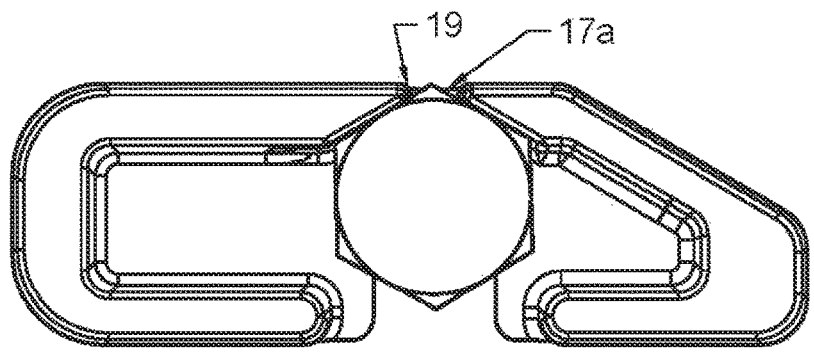
FIG. 20 thru FIG. 30 illustrate views of the rail clip assemblies, in accordance with some embodiments of the present subject matter.
Figure 21:
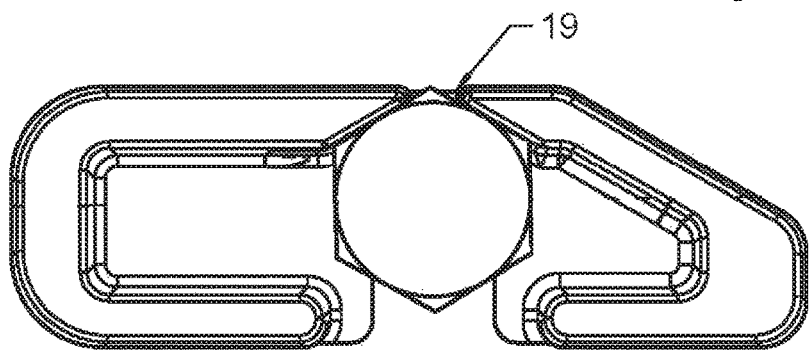
Figure 24:
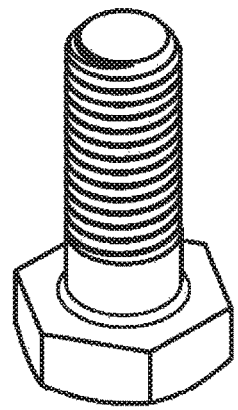
Figure 22:
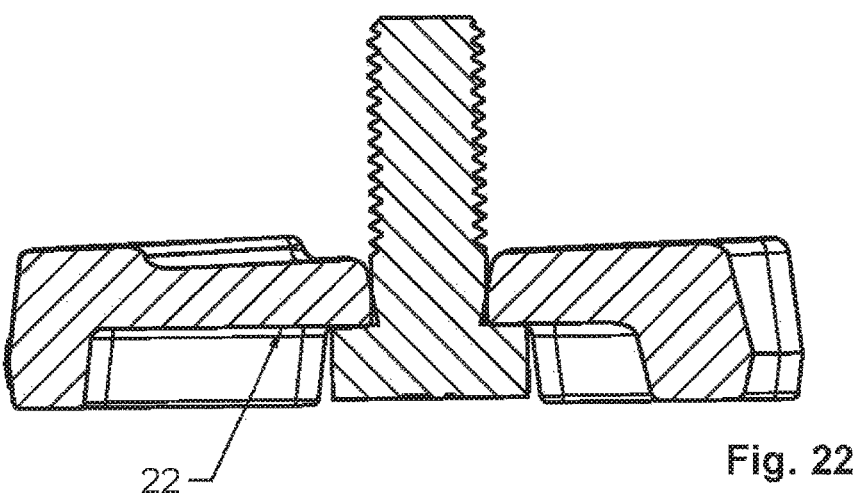
Figure 23:
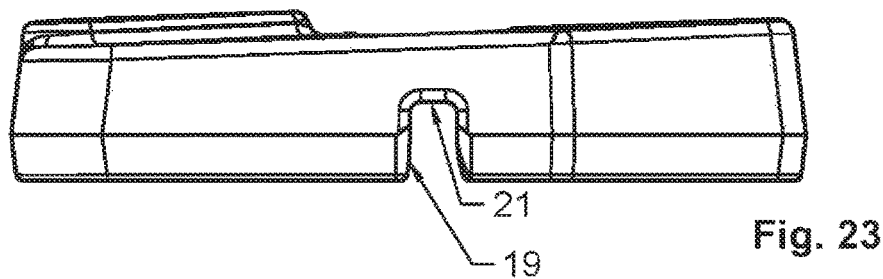
Figure 25:
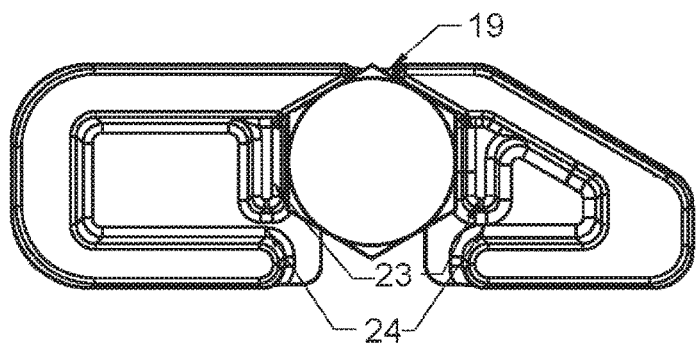
Figure 26:
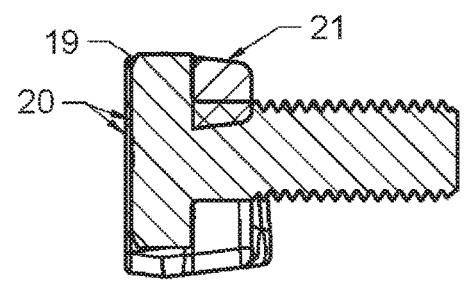

Another embodiment of the rail clip assembly, in accordance with the present subject matter is illustrated in FIG. 20. If the wall local to the bolt head corner is eliminated at location 17a, the gap 19 created in the wall of the base allows this same opening to be used for the evacuation of air and liquid galvanizing from the cavity during the hot dipped galvanizing process. Also, this same opening (gap 19) allows water to escape from the front of the cavity during the life of the installation (refer to FIGS. 20, 21, 22 and 23). FIG. 22 is a cross section of FIG. 21 through the bolt and clip base. FIG. 25 is bottom view of the clip base 1. FIG. 26 is a cross section of FIG. 25 through the bolt and clip base. Note the bolt head is slightly elevated above the surface of the support structure to allow for the passage of the bolt along the slot within the welded base. This feature can be seen in FIG. 26. This gap 20 underneath the bolt also allows water to escape from within the base. FIG. 26 shows the relationship of the bolt head at the location where the bolt head corner penetrates the clip cavity. The section 21 of the cavity wall that is above the opening in the cavity wall is relatively thick and therefore allows for the base to be cast or forged in weldable steel.

Figure 27:
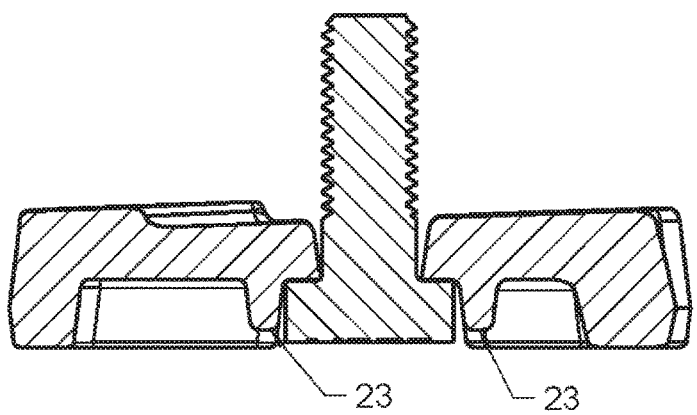
Figure 28:
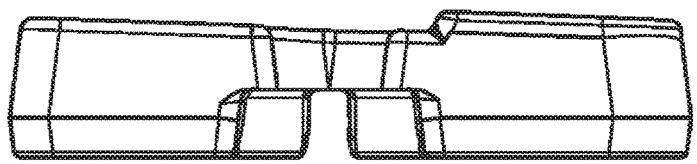
Figure 29:
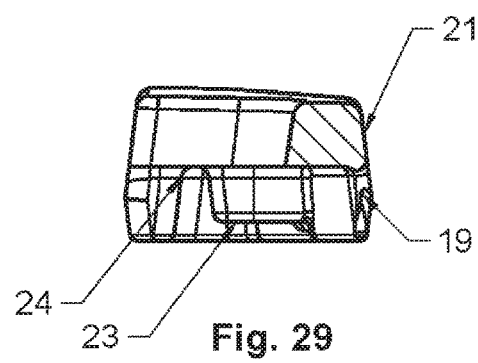

With reference to FIG. 22, the tightening of the nut on the threaded bolt pulls the bolt head towards the ceiling 22 of the clip base 1 that is the part of the clip base in contact with the top of the bolt head. This puts significant stresses into the ceiling 22 that is in contact with the bolt head. These stresses from the bolt head can deform the ceiling by trying to pull the bolt head up through the ceiling, thereby causing failure of the assembly to function correctly. FIG. 27 is a cross section of FIG. 25 through the bolt and clip base. With reference to FIGS. 25 and 27, addition of stiffeners 23 along or close to the edge of the bolt head improves the structural integrity of the ceiling of the base against deformation. These stiffeners may extend down from the ceiling to the support surface. In an embodiment, the stiffeners do not extend all the way to the support surface, leaving a gap for any air or molten galvanizing to escape from the cavity or water to escape during the life of the installation. In another embodiment, with reference to FIGS. 25 and 29, the stiffener or stiffeners do not close off the cavity. FIG. 29 is a section of FIG. 28 through the bolt capturing location within the clip base. A gap 24 is created that can run from the ceiling 22 to the support surface 2 to ventilate the cavity and allow all internal surfaces of the base to receive galvanizing. This also prevents the entrapment of water within the base during the life of the installation.

Figure 30:
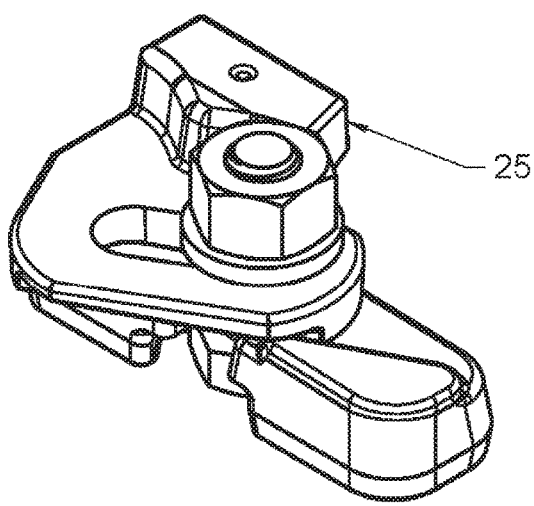

With reference to FIG. 30, this shows the rail clip completely assembled. The clip top has a cavity 25 to receive a resilient member 26 that applies a downward force onto the top of the rail flange. This feature can also be seen in FIG. 2 in the prior art.

It is to be noted that although the rail clip assembly in accordance with embodiments of the present invention are shown to include one bolt used for fastening the top to the base, the number of bolts in not limited to one. Other embodiments of the rail clip assemblies of similar construction including more than one bolt for fastening the top to the base are well within the ambit of the present invention.

Different characteristics and beneficial particulars are unfolded fully with reference to the embodiments/aspects which are exemplified in the accompanying drawing and detailed in the preceding description. Descriptions of techniques, methods, components, and equipment that a person skilled in the art is well aware of or those form common general knowledge in the field pertaining to the present subject matter is not described and/or introduced for the purpose of focusing on the present subject matter and not to obscure the present subject matter and advantageous features thereof. At the same time the present subject matter and its features that are explained herein in the detailed description and the specific examples, are given by way of illustration only, and not by way of limitation. It is to be understood that a person skilled in the art may and can think of various alternative substitutions, modifications, additions, and/or rearrangements which are considered to be within the spirit and/or scope of the underlying inventive concept.

In the present specification the word "comprise", or variations thereof, such as "comprises" or "comprising", imply the inclusion of a stated element, integer or step, or group of elements, integers or steps, but not the exclusion of any other element, integer or step, or group of elements, integers or steps.

Further, the use of the expression "at least" or "at least one" suggests the use of one or more elements or ingredients or quantities, as the use can be in the embodiment of the present subject matter to achieve one or more of the desired objects or results.

I claim:

1. A clip assembly for securing a rail to a support surface, said assembly comprising:
   a. a base body attachable to said support surface, said base body defining a cavity at an underside said base body, wherein said cavity and said support surface define a space at said underside of said base body, said base body comprising:
      i. a first wall that is adjacent said rail when said base body is secured on said support surface, said first wall also defining an inclined portion;
      ii. a depression configured on said first wall;
      iii. a substantially horizontal slot configured on said base body extending toward said first wall; and
   b. a top body assemblable on said base body, said top body comprising:
      i. a rail abutting portion that defines a substantially L-shaped surface to abut said rail;
      ii. a slot configured on said top body;
   c. a screw fittable into said first wall and passes through said slot configured on said top body, wherein a portion of said screw fits into said depression of said first wall to secure said screw while said screw is received within said space, and wherein a shank of said screw abuts a portion of said substantially horizontal slot on said base body and said slot on said top body when a nut is tightened on said shank for securing said top body to said base body to secure said rail,
   wherein said top body and said base body have complementary inclined abutting surfaces, and
   wherein said complementary inclined abutting surfaces, said slot on said top body, and said inclined portion of said base body are inclined at identical angle.

2. The clip assembly as claimed in claim 1, wherein said rail abutting portion fits operatively between said rail and said inclined portion in an assembled configuration of said top body and said base body.

3. The clip assembly as claimed in claim 1, wherein the complementary inclined abutting surfaces facilitate guided sliding movement between said top body and said base body.

4. The clip assembly as claimed in claim 1, wherein said screw is a screw having a polygonal head to fit into said depression.

5. A clip assembly for securing a rail to a support surface, said assembly comprising:
   a. a base body attachable to said support surface, said base body defining a cavity at an underside said base body, wherein said cavity and said support surface define a space at said underside of said base body, said base body comprising:
      i. a first wall that is adjacent said rail when said base body is secured on said support surface, said first wall also defining an inclined portion;
      ii. a recess configured on said first wall;
      iii. a substantially horizontal slot configured on said base body extending toward said first wall; and
   b. a top body assemblable on said base body, said top body comprising:
      i. a rail abutting portion that defines a substantially L-shaped surface to abut said rail;
      ii. a slot configured on said top body;
   c. a screw fittable into said first wall and passes through said slot configured on said top body, wherein a portion of said screw fits into said recess of said first wall to secure said screw while said screw is received within said space, and wherein a shank of said screw abuts a portion of said substantially horizontal slot on said base body and said slot on said top body when a nut is tightened on said shank for securing said top body to said base body to secure said rail,
   wherein said top body and said base body have complementary inclined abutting surfaces, and
   wherein said complementary inclined abutting surfaces, said slot on said top body, and said inclined portion of said base body are inclined at identical angle.

6. The clip assembly as claimed in claim 5, wherein said rail abutting portion fits operatively between said rail and said inclined portion in an assembled configuration of said top body and said base body.

7. The clip assembly as claimed in claim 5, wherein the complementary inclined abutting surfaces facilitate guided sliding movement between said top body and said base body.

8. The clip assembly as claimed in claim 5, wherein said screw is a screw having a polygonal head to fit into said recess.

9. The clip assembly as claimed in claim 5, further comprising at least one stiffener formation configured on the underside of said base to interact with said screw adjacent a head portion of said screw when said screw is received within said substantially horizontal slot on said base body.

10. The clip assembly as claimed in claim 9, wherein the configuration of said at least one stiffener formation facilitates a formation of gap at the underside of said stiffener formation, wherein said gap prevents the entrapment of air and liquids between the base body and the support surface.

* * * * *